(12) United States Patent
Sadek et al.

(10) Patent No.: US 9,144,084 B2
(45) Date of Patent: Sep. 22, 2015

(54) MULTI-RADIO COEXISTENCE

(75) Inventors: Ahmed K. Sadek, San Diego, CA (US); Tamer Adel Kadous, San Diego, CA (US); Ashok Mantravadi, San Diego, CA (US); Jibing Wang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 243 days.

(21) Appl. No.: 13/491,931

(22) Filed: Jun. 8, 2012

(65) Prior Publication Data

US 2012/0314598 A1 Dec. 13, 2012

Related U.S. Application Data

(60) Provisional application No. 61/496,515, filed on Jun. 13, 2011.

(51) Int. Cl.
| | |
|---|---|
| *H04L 1/02* | (2006.01) |
| *H04W 72/12* | (2009.01) |
| *H04W 16/14* | (2009.01) |
| *H04W 28/04* | (2009.01) |
| *H04W 88/06* | (2009.01) |

(52) U.S. Cl.
CPC .......... *H04W 72/1215* (2013.01); *H04W 16/14* (2013.01); *H04W 28/048* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,027,418 B2 | 4/2006 | Gan et al. | |
| 7,991,413 B2 | 8/2011 | Honkanen et al. | |
| 2005/0239497 A1* | 10/2005 | Bahl et al. ................. | 455/552.1 |
| 2009/0003294 A1* | 1/2009 | Zhu et al. ..................... | 370/338 |
| 2009/0143095 A1* | 6/2009 | Zhang ........................ | 455/552.1 |
| 2009/0245221 A1* | 10/2009 | Piipponen ..................... | 370/343 |
| 2009/0257379 A1* | 10/2009 | Robinson et al. ............. | 370/329 |
| 2009/0262785 A1 | 10/2009 | Wilhelmsson | |
| 2010/0137025 A1 | 6/2010 | Tal et al. | |
| 2010/0304685 A1 | 12/2010 | Wietfeldt et al. | |

OTHER PUBLICATIONS

3GPPTSG-RAN G2#71bis, Oct. 2010, R2-105712.*
Anonymous: "Triggering of Actions related to In-device Coexistence", Internet Citation, Apr. 15, 2011, pp. 1-3, XP007920866, Retrieved from the Internet: URL:http://www.3gpp.org/FTP/tsg_ran/WG2_RL2/TSGR2_73bis/Docs/ [Retrieved on Jul. 24, 2012].
Baghel, et al., "Coexistence Possibilities of LTE with ISM Technologies and GNSS," IEEE, 2011 International Conference on Communications, Jan. 28-30, 2011. p. 1-5.
International Search Report and Written Opinion—PCT/US2012/041885—ISA/EPO—Dec. 4, 2012.

(Continued)

*Primary Examiner* — Kouroush Mohebbi
(74) *Attorney, Agent, or Firm* — Seyfarth Shaw LLP

(57) ABSTRACT

Prior to implementing a coexistence solution for a multi-radio device, a measurement determines whether interference experienced by one radio is caused by another radio on the device. This determination includes comparing measurements of the first radio during times when the other radio is operational and when the other radio is inactive. If the compared performance measurements are within a certain range, a coexistence/interference management solution may be implemented.

24 Claims, 17 Drawing Sheets

(56) References Cited

OTHER PUBLICATIONS

Motorola Mobility: "Text Proposal for 36.816 for Triggering aspects", 3GPP Draft; R2-112249—TP for Triggering Aspects, 3rd Generation Partnership Project (3GPP), Mobile Competence Centre; 650, Route Des Lucioles; F-06921 Sophia-Antipolis Cedex; France, vol. RAN WG2, No. Shanghai, China; Apr. 5, 2011, XP050494591,[retrieved on Apr. 5, 2011].

Motorola: "Solution Directions for LTE-ISM Coexistence", 3GPP Draft; R2-105712-LTE-ISM-Coexistence, 3rd Generation Partnership Project (3GPP), Mobile Competence Centre; 650, Route Des Lucioles; F-06921 Sophia-Antipolis Cedex; France, vol. RAN WG2, No. Xi'an; Oct. 11, 2010, Oct. 7, 2010, XP050452775,[retrieved on Oct. 7, 2010].

* cited by examiner

MULTI-RADIO COEXISTENCE

CROSS REFERENCE TO RELATED APPLICATION

This application claims the benefit of U.S. provisional patent application No. 61/496,515 filed Jun. 13, 2011, in the names of SADEK et al., the disclosure of which is expressly incorporated by reference in its entirety.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher be reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

Offered is a method for wireless communications. The method includes measuring communication performance of a first radio access technology (RAT) during a first time period when a second RAT is not operating. The method also includes measuring communication performance of the first RAT during a second time period. The method further includes comparing the communication performance measurements. The method still further includes implementing a coexistence management solution based at least in part on the communication performance during the first time period and the communication performance during the second time period.

Offered is an apparatus for wireless communication. The apparatus includes means for measuring communication performance of a first radio access technology (RAT) during a first time period when a second RAT is not operating. The apparatus also includes means for measuring communication performance of the first RAT during a second time period. The apparatus further includes means for comparing the communication performance measurements. The apparatus still further includes means for implementing a coexistence management solution based at least in part on the communication performance during the first time period and the communication performance during the second time period.

Offered is a computer program product for wireless communication in a wireless network. The computer program product includes a computer-readable medium having non-transitory program code recorded thereon. The program code includes program code to measure communication performance of a first radio access technology (RAT) during a first time period when a second RAT is not operating. The program code also includes program code to measure communication performance of the first RAT during a second time period. The program code further includes program code to compare the communication performance measurements. The program code still further includes program code to implement a coexistence management solution based at least in part on the communication performance during the first time period and the communication performance during the second time period.

Offered is an apparatus for wireless communication. The apparatus includes a memory and a processor(s) coupled to the memory. The processor(s) is configured to measure communication performance of a first radio access technology (RAT) during a first time period when a second RAT is not operating. The processor(s) is also configured to measure communication performance of the first RAT during a second time period. The processor(s) is further configured to compare the communication performance measurements. The processor(s) is still further configured to implement a coexistence management solution based at least in part on the communication performance during the first time period and the communication performance during the second time period.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Various aspects of the disclosure provide techniques to mitigate coexistence issues in multi-radio devices, where significant in-device coexistence problems can exist between, e.g., the LTE and Industrial Scientific and Medical (ISM) bands (e.g., for BT/WLAN). Interference experienced by a radio in a multi-radio device may be caused by another radio in the device or may be caused by some other factor. Prior to implementing a coexistence management solution, it may be desired for a multi-radio device to determine whether interference is caused by one or more other radios on the device, as described below.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3$^{rd}$ Generation Partnership Project" (3GPP). CDMA2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Figure 1:
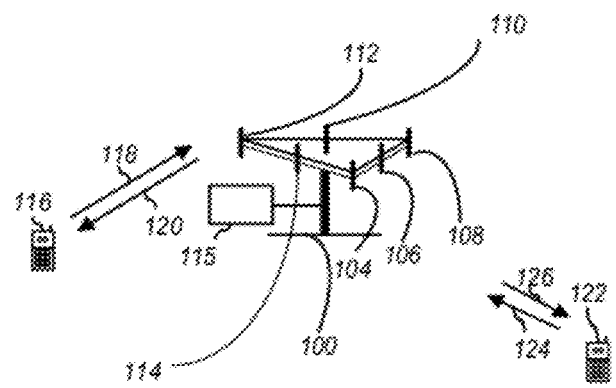
FIG. 1 illustrates a multiple access wireless communication system according to one aspect.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (UL) 188. The UE 122 is in communication with antennas 106 and 108, while antennas 106 and 108 transmit information to the UE 122 over a downlink (DL) 126 and receive information from the UE 122 over an uplink 124. In a frequency division duplex (FDD) system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
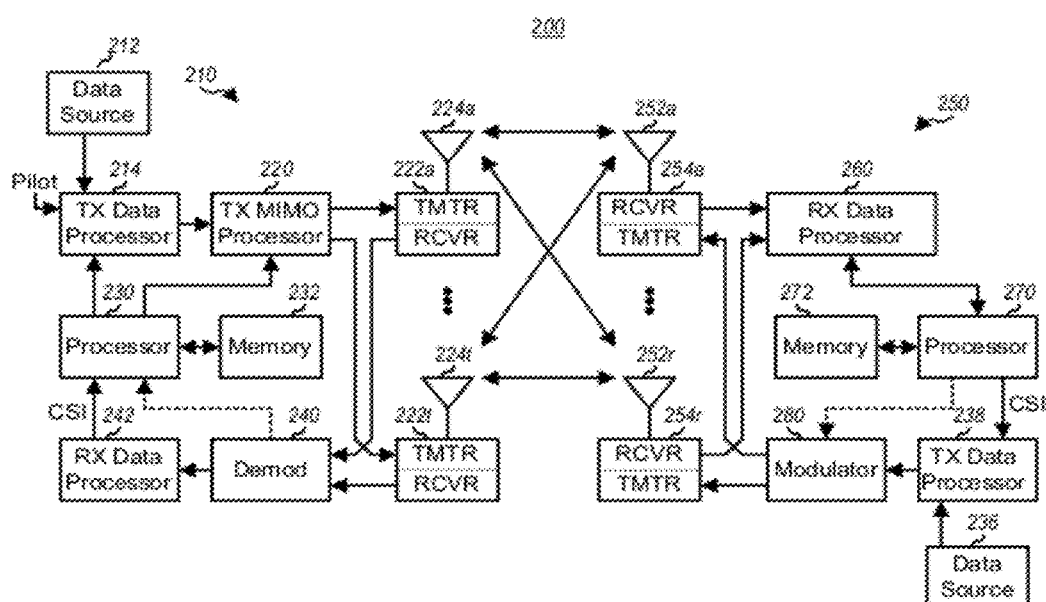
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
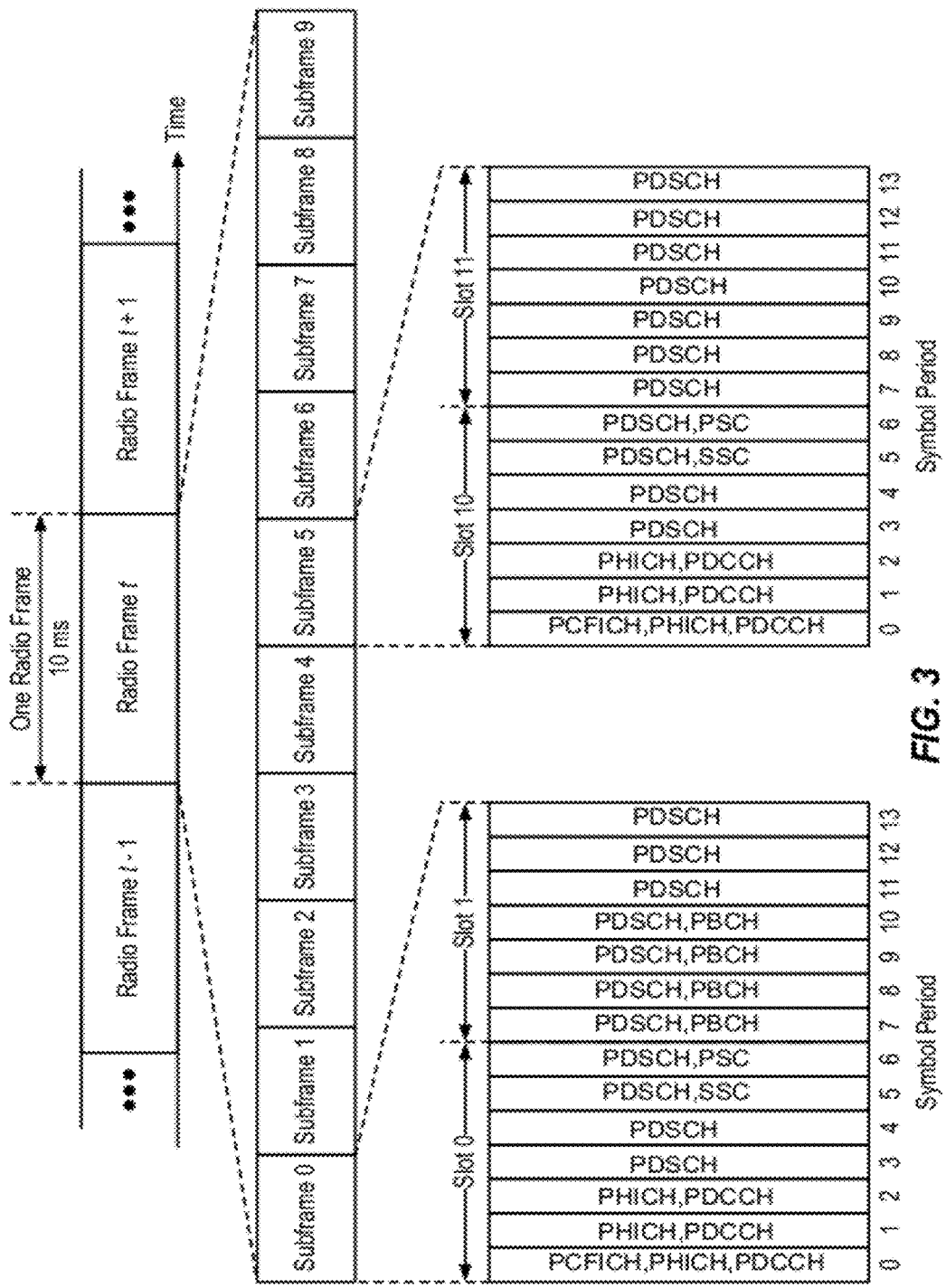
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
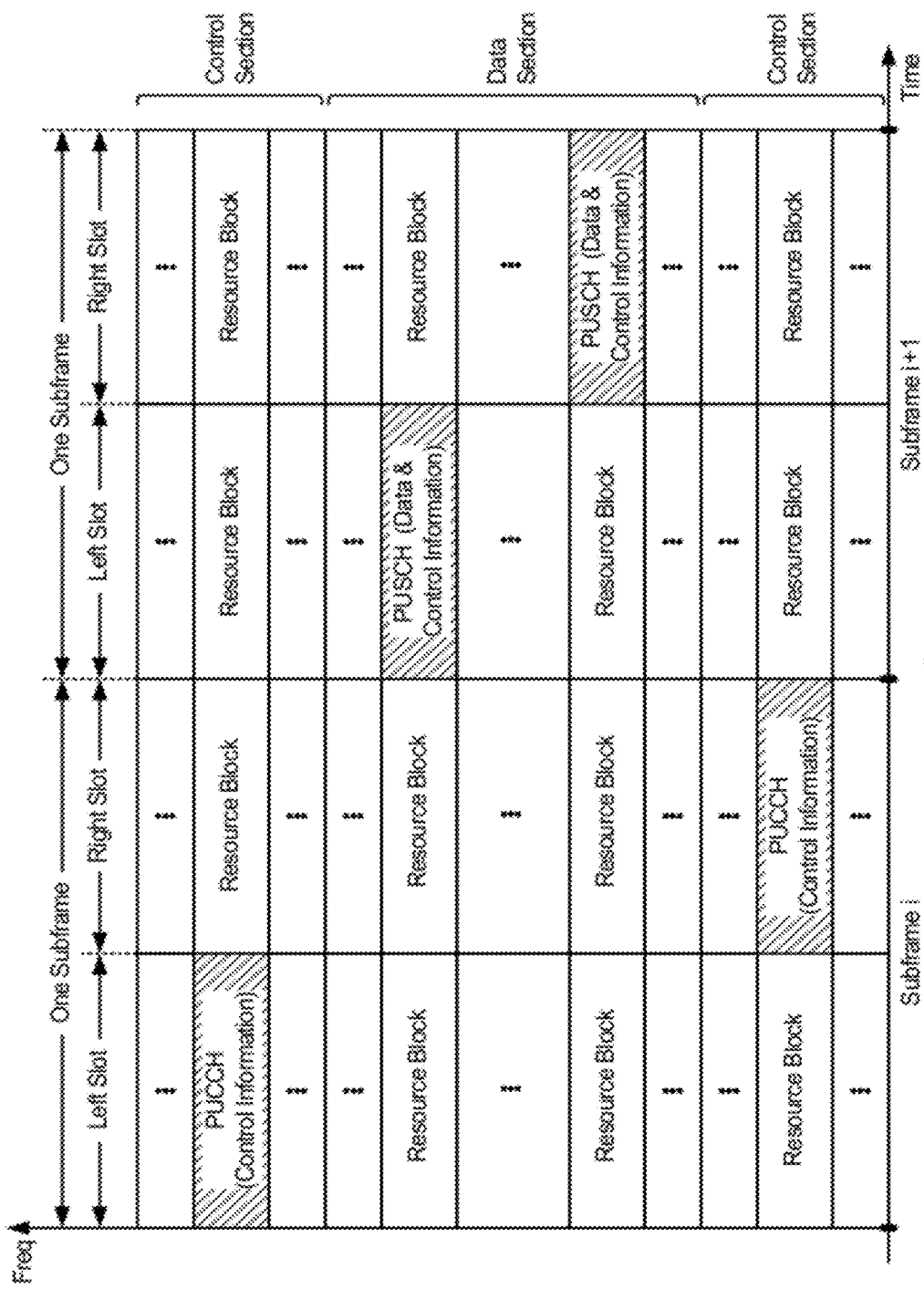
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
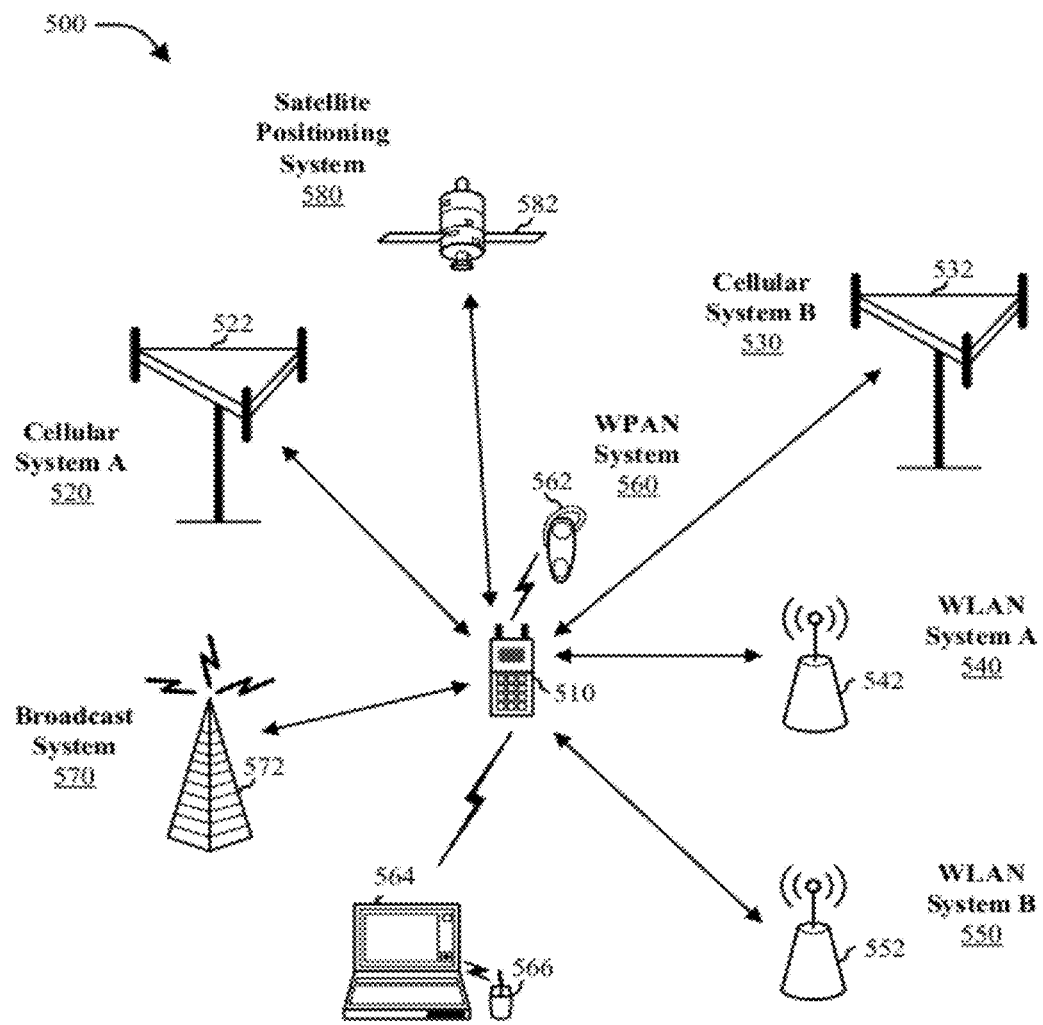
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3$^{rd}$ Generation Partnership Project" (3GPP). cdma2000 and UMB are described in documents from an organization named "3$^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
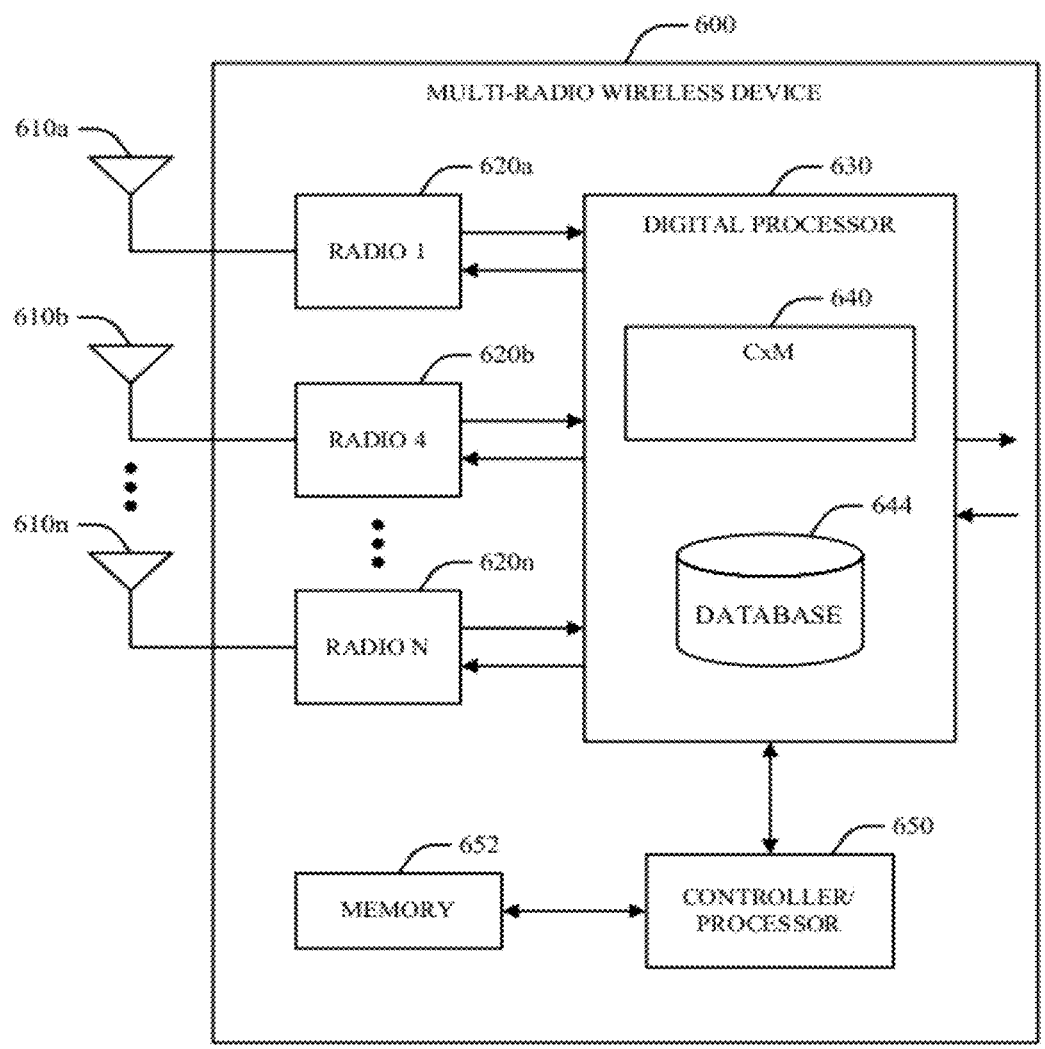
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a coexistence manager (CxM) 640 that can control operation of the radios 620 in order to improve the performance of the wireless device 600 as generally described herein. The coexistence manager 640 can have access to a database 644, which can store information used to control the operation of the radios 620. As explained further below, the coexistence manager 640 can be adapted for a variety of techniques to decrease interference between the radios. In one example, the coexistence manager 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
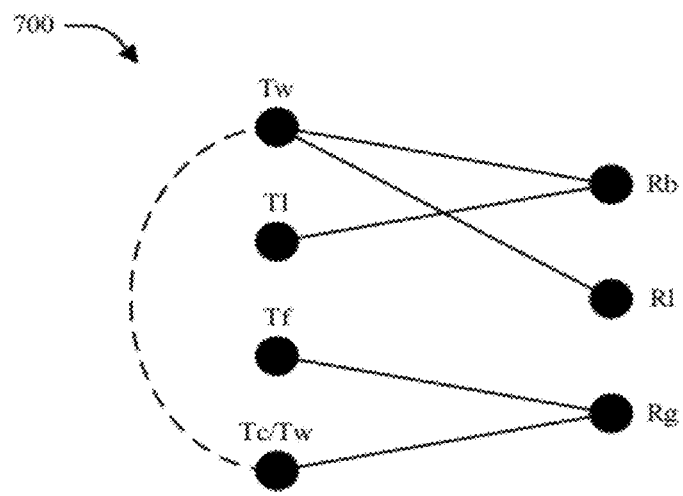
FIG. 7 is graph showing respective potential collisions between seven example radios in a given decision period.

In an aspect, the coexistence manager 640 can manage operation of respective radios 620 utilized by wireless device 600 in order to avoid interference and/or other performance degradation associated with collisions between respective radios 620. Coexistence manager 640 may perform one or more processes, such as those illustrated in FIG. 11. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (TO and the GPS receiver (Rg); (5) a WLAN transmitter (Tw), a GSM/WCDMA transmitter (Tc/Tw), and a GPS receiver (Rg).

Figure 8:
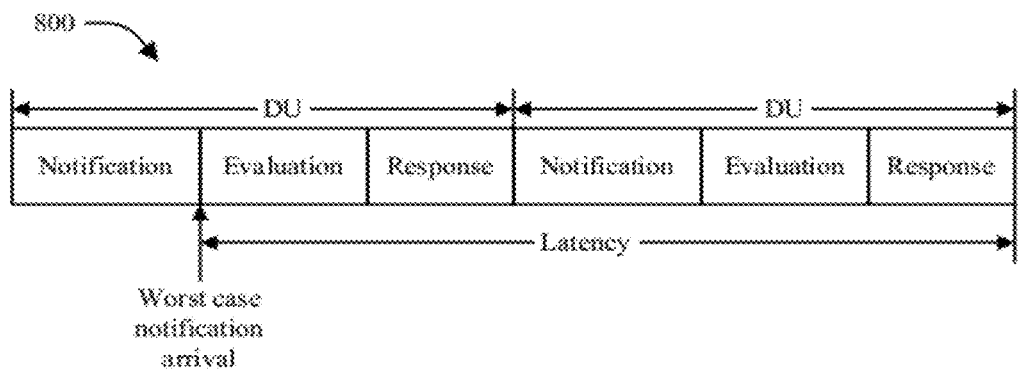
FIG. 8 is a diagram showing operation of an example Coexistence Manager (CxM) over time.

In one aspect, an example coexistence manager 640 can operate in time in a manner such as that shown by diagram 800 in FIG. 8. As diagram 800 illustrates, a timeline for coexistence manager operation can be divided into Decision Units (DUs), which can be any suitable uniform or non-uniform length (e.g., 100 µs) where notifications are processed, and a response phase (e.g., 20 µs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

Figure 9:
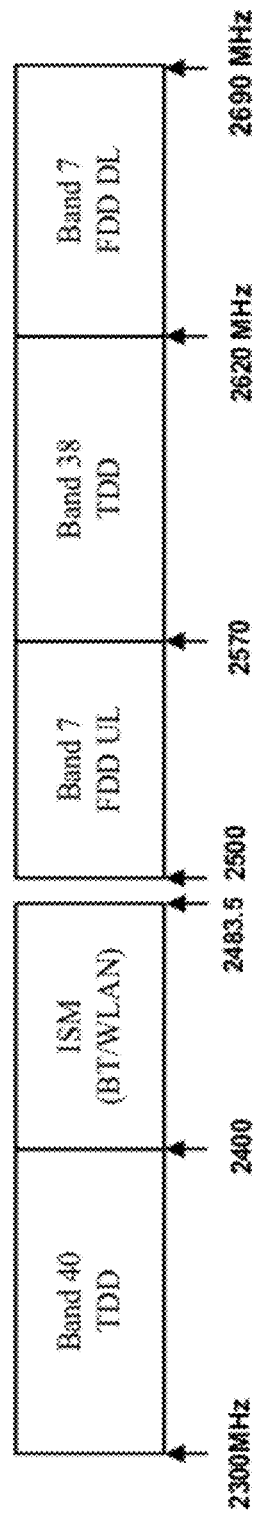
FIG. 9 is a block diagram illustrating adjacent frequency bands.

As shown in FIG. 9, Long Term Evolution (LTE) in band 7 (for frequency division duplex (FDD) uplink), band 40 (for time division duplex (TDD) communication), and band 38 (for TDD downlink) is adjacent to the 2.4 GHz Industrial Scientific and Medical (ISM) band used by Bluetooth (BT) and Wireless Local Area Network (WLAN) technologies. Frequency planning for these bands is such that there is limited or no guard band permitting traditional filtering solutions to avoid interference at adjacent frequencies. For example, a 20 MHz guard band exists between ISM and band 7, but no guard band exists between ISM and band 40.

To be compliant with appropriate standards, communication devices operating over a particular band are to be operable over the entire specified frequency range. For example, in order to be LTE compliant, a mobile station/user equipment should be able to communicate across the entirety of both band 40 (2300-2400 MHz) and band 7 (2500-2570 MHz) as defined by the 3rd Generation Partnership Project (3GPP). Without a sufficient guard band, devices employ filters that overlap into other bands causing band interference. Because band 40 filters are 100 MHz wide to cover the entire band, the rollover from those filters crosses over into the ISM band causing interference. Similarly, ISM devices that use the entirety of the ISM band (e.g., from 2401 through approximately 2480 MHz) will employ filters that rollover into the neighboring band 40 and band 7 and may cause interference.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNB can use to make inter-frequency or inter-RAT handoff decisions to, e.g., move LTE to a channel or RAT with no coexistence issues. However, it can be appreciated that these existing techniques will not work if, for example, the LTE uplink is causing interference to Bluetooth/WLAN but the LTE downlink does not see any interference from Bluetooth/WLAN. More particularly, even if the UE autonomously moves itself to another channel on the uplink, the eNB can in some cases handover the UE back to the problematic channel for load balancing purposes. In any case, it can be appreciated that existing techniques do not facilitate use of the bandwidth of the problematic channel in the most efficient way.

Figure 10:
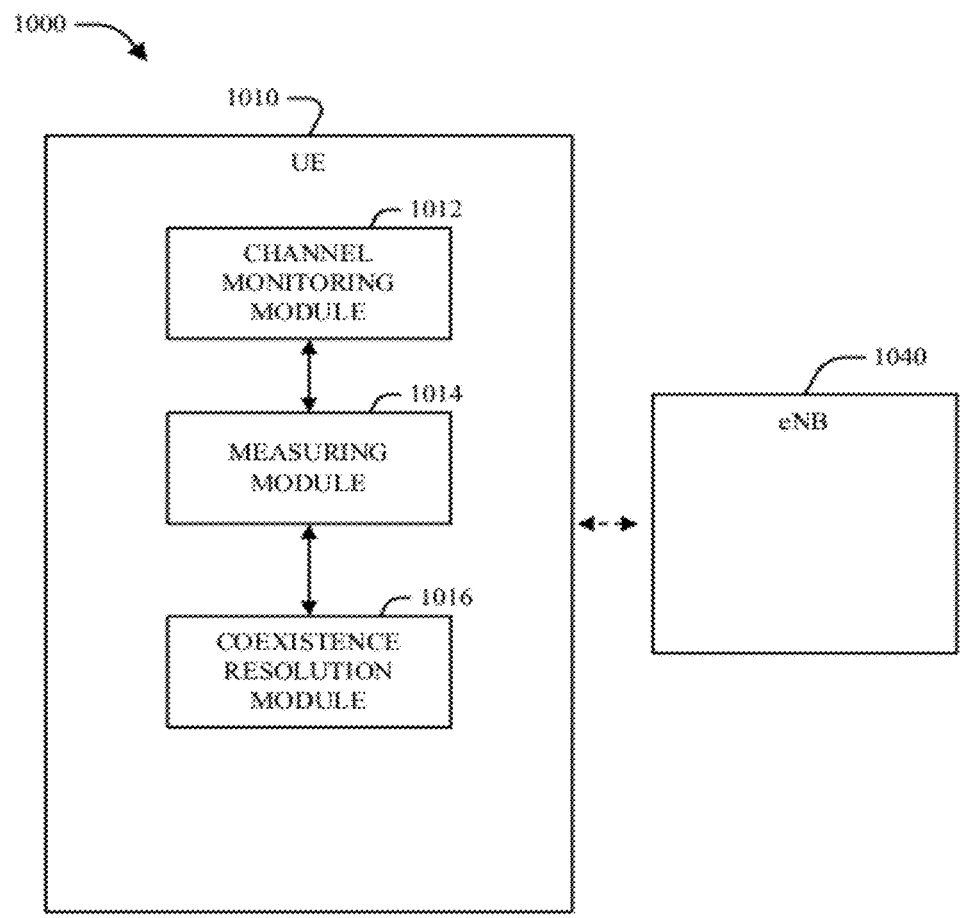
FIG. 10 is a block diagram of a system for providing support within a wireless communication environment for multi-radio coexistence management according to one aspect of the present disclosure.

Turning now to FIG. 10, a block diagram of a system 1000 for providing support within a wireless communication environment for multi-radio coexistence management is illustrated. In an aspect, the system 1000 can include one or more UEs 1010 and/or eNBs 1040, which can engage in uplink and/or downlink communications, and/or any other suitable communication with each other and/or any other entities in the system 1000. In one example, the UE 1010 and/or eNB 1040 can be operable to communicate using a variety resources, including frequency channels and sub-bands, some of which can potentially be colliding with other radio resources (e.g., a broadband radio such as an LTE modem). Thus, the UE 1010 can utilize various techniques for managing coexistence between multiple radios utilized by the UE 1010, as generally described herein.

To mitigate at least the above shortcomings, the UE 1010 can utilize respective features described herein and illustrated by the system 1000 to facilitate support for multi-radio coexistence within the UE 1010. For example, a channel monitoring module 1012, a measuring module 1014, and a coexistence resolution module 1016 can be provided. The channel monitoring module 1012 monitors communication channels. The measuring module 1014 may measure performance of various radio access technologies (RATs) at certain times. The coexistence resolution module 1016 may coordinate and implement a solution to reduce interference, along with a coexistence manager. The various modules 1012-1016 may, in some examples, be implemented as part of a coexistence manager such as the coexistence manager 640 of FIG. 6. The various modules 1012-1016 and others may be configured to implement the embodiments discussed herein.

In a multi-radio device, one radio in the device may cause interference with another radio in the device, particularly if the radios communicate using adjacent bandwidths. Specifically, transmission by one radio may interfere with reception by another. A number of solutions may be employed to manage coexistence issues. One example solution is power backoff, where the power of an aggressor radio is lowered to prevent interference to a victim radio. Another example solution is frequency hopping, where communications using one radio are redirected to a frequency spectrum less likely to cause interference with a victim radio. Another example solution is time-division multiplexing, where each radio is permitted to communicate during certain times where the other radio is not. Other solutions are also possible.

Prior to implementing such coexistence solutions, however, it may be desirable to determine whether interference to a victim radio is caused by the aggressor radio prior to adjusting the operation of the suspected aggressor radio through power backoff, frequency hopping, or other modifications. Offered is a method for determining whether a suspected aggressor radio is causing interference to a victim, and for implementing coexistence solutions when desired to curb aggressor interference.

For purposes of the detailed discussion below, a multi-radio device with a Long Term Evolution (LTE) radio and a Bluetooth (BT) radio is described, though the teachings below may be applied to various other configurations of a multi-radio device, such as a WLAN/LTE configuration. Also, in the discussion below, Bluetooth is illustrated as the victim radio and LTE as the aggressor, but other victim/aggressor scenarios are envisioned.

In a multi-radio device, if a Bluetooth radio suffers from performance degradation or interference, it is possible that an on-device LTE radio is the cause of the Bluetooth performance drop. It is also possible that another factor may be the cause of the Bluetooth performance drop, such as a Bluetooth device being out of range, an external interferer causing problems for Bluetooth, a bad link, or other reason. If an assumption is made that LTE is the cause of the interference without confirmation, a solution such as power backoff may be applied to LTE prematurely, thus unnecessarily impacting the performance of the LTE operation without corresponding improvement to the Bluetooth operation.

To determine whether LTE is the source of interference to Bluetooth, and how to respond based on the determination, an interference assessment (IA) method is offered. Interference assessment will assist in a determination of whether a victim's performance (e.g., Bluetooth) is caused by an aggressor (e.g., LTE). If the aggressor is the cause, solutions may be applied, with examples provided below. If not, no modifications to LTE operations are implemented. In this manner the interference assessment method may be employed as described below to implement coexistence solutions more efficiently.

Two Bluetooth operation modes are discussed in the context of interference assessment. The first, extended synchronous connections (eSCO), is typically associated with Bluetooth voice communications. The second, advanced audio distribution profile (A2DP) mode, is typically associated with Bluetooth audio streaming mode. The eSCO mode is discussed first, with differences between eSCO mode and A2DP mode following.

Interference Assessment During eSCO Operation

Interference assessment in eSCO (voice) operation is determined by measuring Bluetooth performance when LTE is not operational and comparing that performance with measurements of Bluetooth performance when LTE is operational. If the performance differences exceed certain thresholds, LTE may be determined to be an aggressor to Bluetooth, and coexistence remedies may be implemented. A variety of metrics may be used to measure Bluetooth performance. For example, packet error rate (PER), slot error rate (SLER), and/or received signal strength indication (RSSI) may all be used.

Interference assessment may be periodically performed over a window of $T_{IA}$ (for example, 1 second). A Bluetooth radio may send feedback about each receive slot to the coexistence manager. The feedback may carry two bits of information. The first bit may indicate whether the particular receive slot is a valid Bluetooth receive slot (as Bluetooth may not receive during a specific slot), and the second bit may carry a cyclic redundancy check (CRC) decoding statistic (i.e., pass/fail). A coexistence manager may assume that a remote transmission is always present in a reserved receive slot and thus, a received packet in a reserved slot may only be in error due to a local device error, i.e., header error or CRC error. A received packet in a non-reserved slot might be in error because any of the following three reasons:

A remote device header error occurred in the previous transmit slot and the remote device is a slave so it will not respond;

A local device header error; or

A local device CRC fail.

This may be approximately expressed by the following equation:

$$SLER_{Rx} \approx HER_{remote} + HER_{local} + CRC_{local}$$

At the beginning of the interference assessment process, if Bluetooth performance is measured as suffering from interference (for example, if a Bluetooth packet error rate is high) and LTE is on, Bluetooth may request a remote device (such as a headset) to operate at highest transmission power to ensure Bluetooth is operating at full capacity. Bluetooth may then send a trigger to a coexistence manager (CxM) to begin measurements of Bluetooth operation as described below.

In one aspect, a measurement of a Bluetooth receive slot error rate occurs when LTE is off. The slot error rate when LTE is not transmitting provides a performance metric indicating Bluetooth's performance independent of LTE. A long term/average Bluetooth packet error rate may also be measured. This measurement would include the impact of LTE and other potential interferers. If the slot error rate is high when LTE is off, then coexistence solutions may not be called for because LTE may not be the cause of interference. If the slot error rate is low when LTE is on, then LTE may be the interferer and a solution such as LTE power backoff may be called for. In this manner, LTE power backoff will only be implemented when it is likely to be useful in improving Bluetooth performance, namely when the interference assessment determines LTE to be causing interference to Bluetooth. If LTE is causing Bluetooth's high packet error rate, an LTE power backoff loop may be applied, reducing LTE's maximum transmission power to meet target Bluetooth performance (i.e., a target packet error rate) while also meeting a minimum LTE performance threshold.

To improve operation of the interference assessment, thresholds may be chosen to reduce the probability of false alarms, thus reducing subsequent impact to LTE operation. For example, if the Bluetooth packet error rate when LTE is not operating is above a certain target packet error rate, LTE will not perform power backoff as the power backoff may be unlikely to improve Bluetooth performance, leading to continuing increases in LTE power backoff without corresponding improvements to Bluetooth performance. Threshold target packet error rates may be chosen to reduce such false alarms. Similarly, thresholds may also be chosen to reduce the likelihood of misdetection in scenarios where LTE communication is intermittent/bursty, thus protecting Bluetooth operation when LTE is the cause.

Bluetooth performance may be measured over windows of various lengths. In one aspect, a one second window may be implemented to ensure a sufficient sample length. In another aspect a smaller window on the order of a power headroom report update window (~100 ms) may be implemented to allow fast response to a high Bluetooth packet error rate. In one aspect, interference assessment may continuously run on a multi-radio device. In another aspect, interference assessment may be turned on and off.

Sorting Good/Bad Bluetooth Time Slots

For purposes of measuring Bluetooth performance, Bluetooth may only report to the coexistence manager (CxM) data regarding valid Bluetooth receive slots. For example, if Bluetooth is not receiving during a particular slot, data regarding that slot may be discarded rather than included for interference assessment purposes. Bluetooth may also send the coexistence manager the cyclic redundancy check (CRC) decoding statistic.

Figure 11:
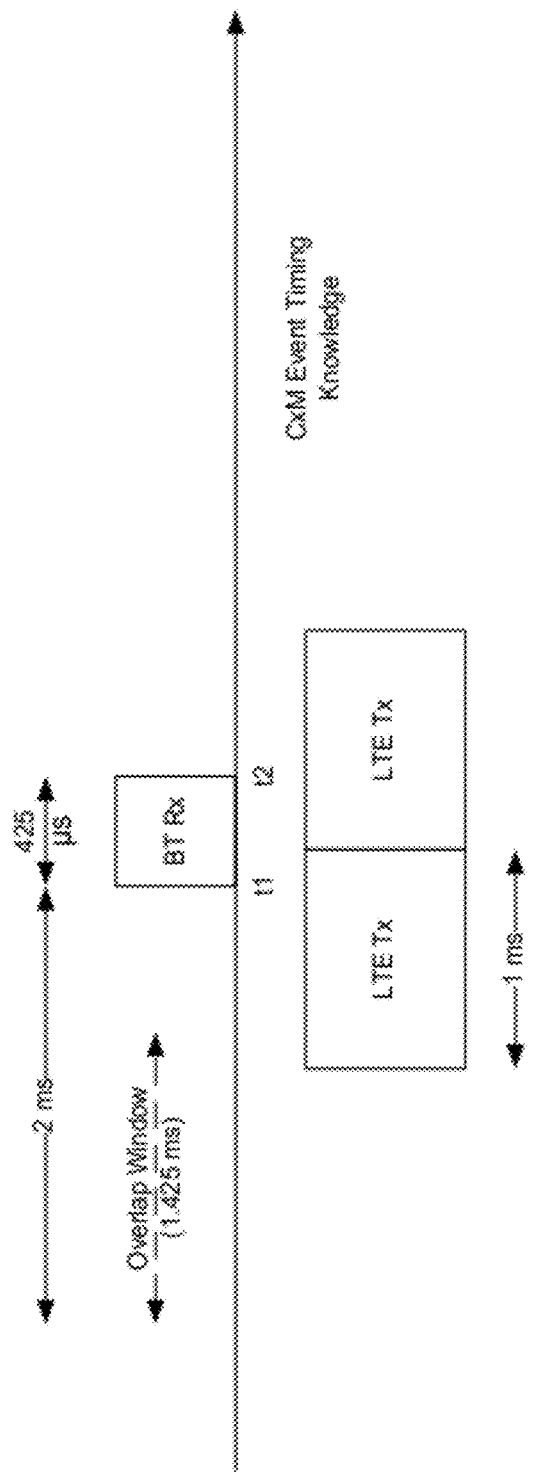
FIG. 11 is a block diagram illustrating coexistence manager event knowledge according to one aspect of the present disclosure.

To perform the interference assessment measurements of Bluetooth, the coexistence manager determines which valid Bluetooth slots operate when LTE is off (good samples) and which valid Bluetooth slots operate when LTE is on (bad samples). For each valid Bluetooth receive slot, the coexistence manager may determine if an LTE transmission overlaps with that Bluetooth receive slot. FIG. 11 illustrates event timing knowledge of a coexistence manager. Each LTE transmission event (LTE Tx) is 1 ms in duration. The coexistence manager knows of LTE events 1 ms in advance. Each Bluetooth receive (BT Rx) event is 425 µs in duration. The coexistence manager knows when a particular Bluetooth event starts (t1 as shown in FIG. 11) and ends (t2 as shown in FIG. 11). Bluetooth events scheduled to start during the 1.425 ms long overlap window shown in FIG. 11, may conflict with an LTE transmit event. If any Bluetooth events are scheduled during the overlap window, the coexistence manager may check to see if potentially overlapping LTE events are scheduled on the lower end of the LTE transmit/uplink frequency band, namely Band 7. As shown in FIG. 9 and discussed above, Band 7 is adjacent to the ISM band used by Bluetooth. However only LTE transmissions in the lower end of Band 7 are likely to cause interference to Bluetooth communications. Therefore, the coexistence manager may only consider as potentially aggressor communications, LTE transmissions in the lower range of Band 7 (for example, between 2500 and 2505 MHz). If a Bluetooth receive event coincides with an LTE transmit event in the lower range of Band 7, then the Bluetooth receive event is considered potentially interfered with and may be classified as a "bad" sample. Otherwise, the Bluetooth receive event is classified as a "good" sample.

Various measurements are taken of the "good" samples and "bad" samples to determine if LTE signals are causing interference with Bluetooth or if Bluetooth performance issues are caused by a source other than LTE. For example, a filtered slot error rate (SLER) at a particular time n may be calculated as follows:

$$\overline{SLER}_x(n) = \alpha \overline{SLER}_x(n-1) + (1-\alpha) SLER_x(n) \quad x = b, g$$

where $\alpha$ is a weighting parameter, b=bad samples and g=good samples, and $SLER_x(0)=0$. Thus, $SLER_g$ is the slot error rate for the good Bluetooth samples (i.e., those with no potential interference from LTE) and $SLER_b$ is the slot error rate for the bad Bluetooth samples (i.e., those potentially interfered with by LTE). These measurements may be updated each interference assessment period.

An interference assessment statistic $\xi_{IA}$ may be described as a function of $SLER_g$ and $SLER_b$ as follows:

$$\xi_{IA}(n) = f(\overline{SLER}_b(n), \overline{SLER}_g(n))$$

The filtered slot error rate with no LTE interference $\xi_{IA}(n) = \overline{SLER}_g(n)$ may provide a baseline performance measurement because $SLER_g$ works at low duty cycle and to avoid scenarios when both LTE and ISM are causing interference. LTE gaps may be used to determine the quality of a non-interfered with Bluetooth signal. The difference between $SLER_b$ and $SLER_g$ may be used as an enhancement to reduce misdetection at high LTE duty cycle for the same false alarm.

If a good slot error rate is above a certain threshold, i.e., $\overline{SLER}_g(n) \geq SLER_{g,Low}$, a Bluetooth link may be determined to be inherently bad, and no alterations to LTE will occur. If the good slot error rate is below the threshold, the Bluetooth link may be determined to be good, thereby indicating LTE is causing interference and should be managed using a coexistence solution, such as power backoff.

Figure 12A:
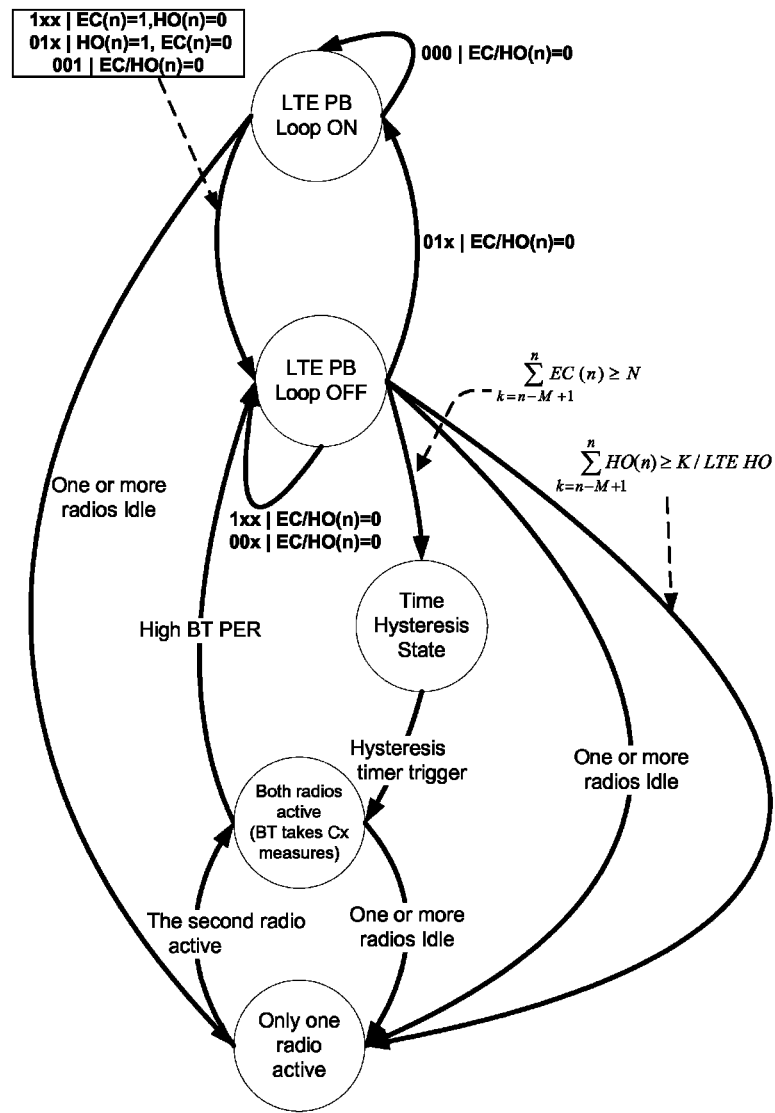
FIG. 12A is a diagram illustrating states of operation for a coexistence manager according to one aspect of the present disclosure.
Figure 12B:
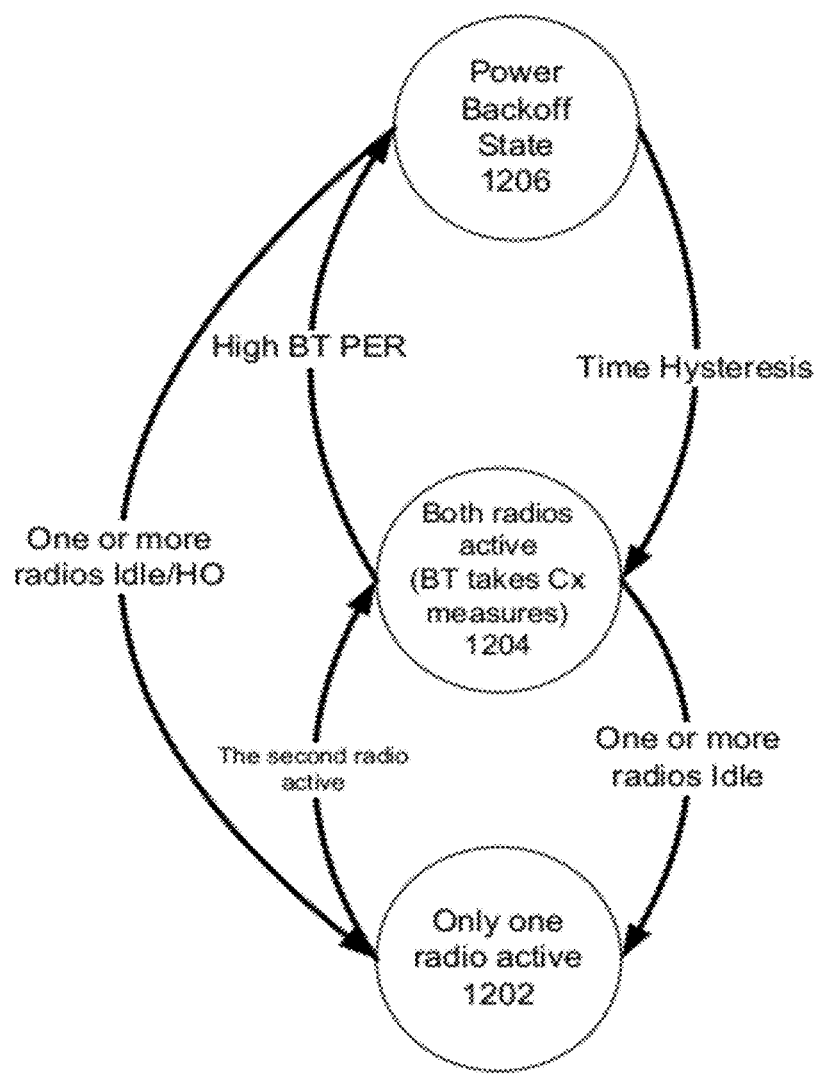
FIG. 12B is a diagram illustrating states of operation for a coexistence manager according to one aspect of the present disclosure.

FIG. 12A shows a state machine illustrating coexistence operation on a multi-radio device employing interference assessment as described herein. For ease of illustration, the state machine of FIG. 12A is divided into two figures, FIG. 12B and FIG. 12C and is explained below. FIG. 12B generally shows three states of coexistence operation for a multi-radio device. In the initial state 1202, only one radio is active and coexistence measures are not active. When a second radio becomes active in a potentially interfering frequency range, the device enters a new state 1204, where both radios are active and Bluetooth may take coexistence measures beginning with interference assessment and performance measurement. From the both radios active state 1204, if one or more radios become idle, the device returns to state 1202. If, however, Bluetooth suffers from a high packet error rate, a coexistence solution such as power backoff is initiated and the device enters the power backoff state 1206. If one or more radios becomes idle or performs handover (HO) to a potentially non-interfering frequency, the device may return to the single radio active state 1202. If the device enters a time hysteresis during the power backoff state, the device may return to the performance measurement state 1204.

Power Backoff Operation

Figure 12C:
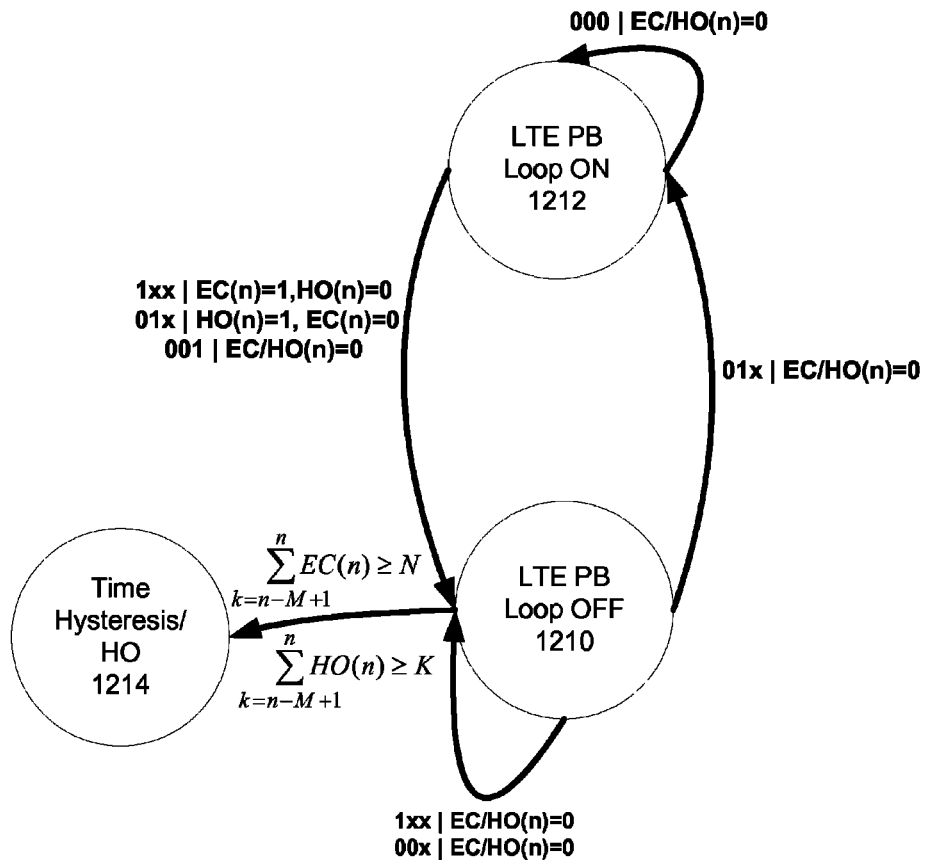
FIG. 12C is a diagram illustrating states of operation for a coexistence manager according to one aspect of the present disclosure.

FIG. 12C describes operation of the coexistence manager in the power backoff state in further detail. Three states are shown in FIG. 12C. In a first state 1210, an LTE power backoff (PB) loop is off. In a second state 1212, an LTE power backoff (PB) loop is on. In a third state 1214, the LTE power backoff loop is exited for a time hysteresis/handover (HO) determination. Transitions between the first two states 1210 and 1212 are determined by the performance level of Bluetooth, whether LTE is interfering with Bluetooth, and whether backoff is successfully preventing LTE interference. These criteria are determined by evaluating three different factors: whether the slot error rate for good Bluetooth samples is above a certain threshold (whether "$SLER_g$=High"), whether the overall Bluetooth packet error rate is above a certain threshold (whether "BT PER=High"), and whether power backoff is small, specifically under a certain threshold (whether there is "Zero Backoff"). Transition to the third state 1214 shown in FIG. 12C is dependent upon whether certain exit criteria have been met, as discussed below.

The three factors $SLER_g$=High, BT PER=High, and Zero Backoff are represented in order by three numerals in the state transition lines shown in FIG. 12C. Each factor is represented by a bit value of either 0, 1. For example, when $SLER_g$=High is 0 (false) this means Bluetooth operation by itself has a low error rate. When $SLER_g$=High is 1 (true) this means Bluetooth operation by itself has a high error rate. When BT PER=High is 0 (false), this means overall Bluetooth operation has a low error rate. When BT PER=High is 1 (true), this means overall Bluetooth operation has a high error rate. When Zero Backoff is 0 (false) this means LTE power backoff is operating above a certain threshold. When Zero Backoff is 1 (true) this means LTE power backoff is operating under a certain threshold. These factors are evaluated during every interference assessment window.

Transitions lines show either a 0, 1, or x. A 0 means the transition happens when the factor is false, a 1 means the transition happens when the factor is true, and an x means that particular factor doesn't matter in the state transition decision. For example, 01x is shown on the line transitioning from LTE power backoff OFF state 1210 to the LTE power backoff ON state 1212. This means that when in the LTE power backoff OFF state 1210, the coexistence manager will transition to the LTE power backoff ON state 1212 when $SLER_g$ is not high (the 0 in the first digit) and the Bluetooth packet error rate is high (the 1 in the second digit). Whether Zero Backoff is true does not matter (the x in the third digit). The situation where the factors are 01x indicates that LTE is interfering with Bluetooth because Bluetooth operation without LTE has a low error rate (the 0 in the first digit) but Bluetooth operation overall has a high error rate (the 1 in the second digit). Thus, when LTE is interfering with Bluetooth the coexistence manager moves from the LTE power backoff OFF state 1210 to the LTE power backoff ON state 1212 in an attempt to have power backoff reduce the level of LTE interference to Bluetooth.

As shown in FIG. 12C, once the LTE power backoff ON state 1212, the coexistence manager may stay in the power backoff loop if the factors are 000. 000 means Bluetooth operation without LTE has a low error rate ($SLER_g$=High is 0), Bluetooth overall error rate is low, (BT PER=High is 0) and power backoff is operating above a threshold (Zero Backoff is 0). In other words, error rates are low while power backoff is operating, meaning power backoff is working.

From the LTE power backoff ON state 1212, the coexistence manager may return to the LTE power backoff OFF state 1210 under three conditions:

(1) The Bluetooth link became bad due to some non-LTE external source (indicated by 1xx, meaning $SLER_g$=High is 1), thus indicating power backoff is no longer desired;
(2) The power backoff is no longer sufficient to avoid interference (indicated by 01x, meaning low error rates for non-LTE Bluetooth ($SLER_g$=High is 0) and continuing high error rates for Bluetooth generally (BT PER=High is 1)), thus indicating that power backoff is no longer solving the interference issues; or
(3) LTE stops being the cause of interference to Bluetooth (indicated by 001, meaning low error rates for non-LTE Bluetooth ($SLER_g$=High is 0), and low error rates for Bluetooth generally (BT PER=High is 0), when power backoff is no longer operating (Zero Backoff is 1), thus indicating that power backoff is no longer needed.

Thus, the transitions between states 1210 and 1212 may be summarized as follows:

| $SLER_g$ = High | BT PER = High | Zero Backoff | Action if in Loop ON | Action if in Loop OFF |
|---|---|---|---|---|
| 0 | 0 | 0 | Stay | Stay |
| 0 | 0 | 1 | Switch | Stay |
| 1 | 0 | x | Switch | Stay |
| 0 | 1 | x | Switch | Switch |
| 1 | 1 | x | Switch | Stay |

In another aspect, for interference estimation, the Bluetooth slot error rate may be calculated when LTE is on and off (corresponding to potentially "bad" and "good" Bluetooth samples, respectively) and those results used to determine whether to implement coexistence management. Bluetooth slot error rate may be calculated as follows:

$$\overline{SLER}_x(n) = 1 - \frac{k_x(n)}{N_x(n)} \quad x = \text{on, off}$$

where $N_X$ is the total number of valid received slots when LTE is x=on/off received during the SLER averaging window $T_{SLER}$, which may be larger than the interference assessment window $T_{IA}$. $k_x$ denotes the total number of successfully received receive (Rx) slots when LTE is x=on/off. The estimate may only be treated as valid if $N_X$ is larger than some minimum number of samples $N_{min}$, otherwise a previous estimate of SLER may be used, and SLER(0) is initialized to 0. The estimated slot error rate for the off ($SLER_{off}$) and on ($SLER_{on}$) samples may be used in the interference assessment method. The baseline method may only use the off statistics for deciding whether LTE power backoff is required. If Bluetooth link conditions are poor regardless of LTE operation, then LTE power backoff may not be implemented. On the other hand, if Bluetooth operates with an acceptable packet error rate without LTE transmission, then LTE may be determined to be the cause of interference, and some interference mitigation scheme, such as LTE power backoff, may be implemented to achieve an acceptable Bluetooth packet error rate/performance.

Two statistics, $S1_{SLER}$ and $S2_{PER}$, may be used in this aspect of interference assessment:

$S1_{SLER}$: A comparison of the Bluetooth slot error rate when LTE is not transmitting in the $1^{st}$ B MHz of the channel ($SLER_{off}$) to a threshold. $SLER_{off}$ must be lower than a threshold SLER_L to stay or enter a LTE power backoff loop (or other coexistence management scheme). Thus, when $SLER_{off} > SLER\_L$ is true (1), no LTE power backoff is implemented. $S1_{SLER}$ may also be expressed as $SLER_{off} > SLER\_L \pm H$ where H a hysteresis value added to SLER_L such that SLER_L−H is used as the threshold to enter a LTE power backoff loop and SLER_L+H is used to exit the LTE power backoff loop. In certain implementations H may equal zero.

$S2_{PER}$: A comparison of the Bluetooth average packet error rate (PER) to a threshold. The Bluetooth PER (BT PER) must be higher than a threshold PER_H to enter a LTE power backoff loop. Thus, when BT PER>PER_H, LTE power backoff may be implemented.

Figure 12D:
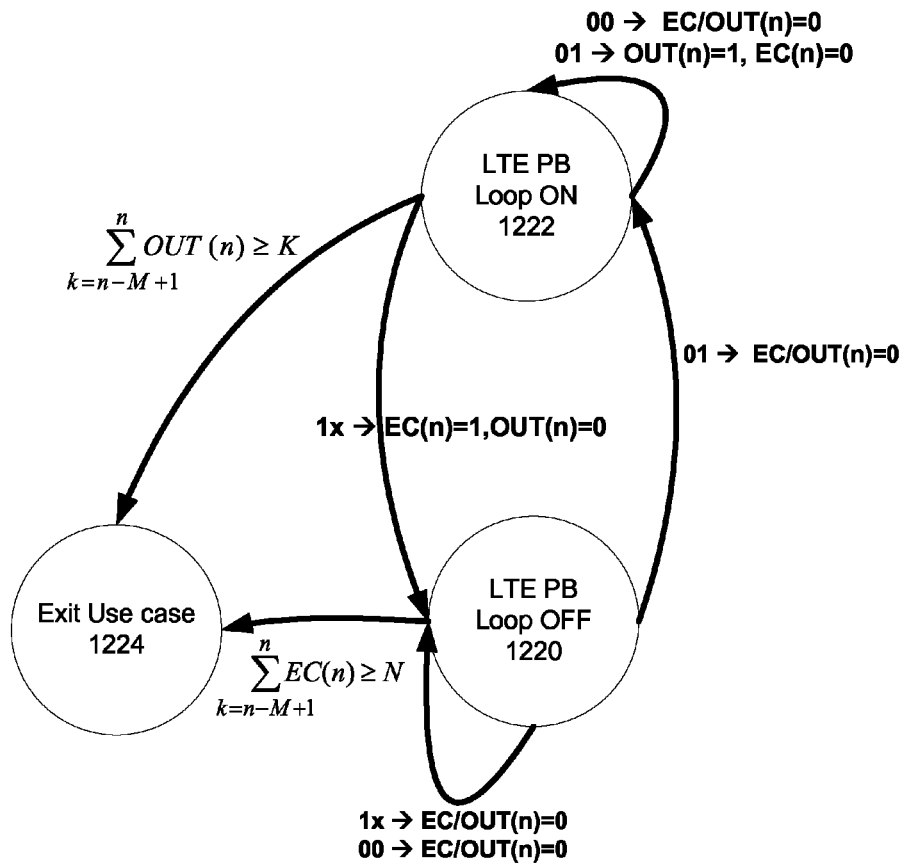
FIG. 12D is a diagram illustrating states of operation for a coexistence manager according to one aspect of the present disclosure.

These two statistics may determine when a coexistence manager triggers a coexistence management state, as shown in FIG. 12D. The state diagram of FIG. 12D may replace the state diagram of FIG. 12C in the appropriate portions of the state machine shown in FIG. 12A.

FIG. 12D describes this operation of the coexistence manager in the power backoff state in further detail. Three states are shown in FIG. 12D. In a first state 1220, an LTE power backoff (PB) loop is off. In a second state 1222, an LTE power backoff (PB) loop is on. In a third state 1224, the LTE power backoff loop is exited. Transitions between the first two states 1220 and 1222 are determined by the performance level of Bluetooth without LTE operation and the average Bluetooth packet error rate. These criteria are judged by statistics $S1_{SLER}$ and $S2_{PER}$, which compare the performance metrics to appropriate thresholds. Transition to the third state 1224 shown in FIG. 12D is dependent upon whether certain exit criteria have been met, as discussed below.

The two statistics $S1_{SLER}$ and $S2_{PER}$ are represented in order by two numerals in the state transition lines shown in FIG. 12D. Each factor is represented by a bit value of either 0, 1. For example, when $SLER_{off} > SLER\_L \pm H$ is 0 (false) this means Bluetooth operation by itself has a low error rate. When $SLER_{off} > SLER\_L \pm H$ is 1 (true) this means Bluetooth operation by itself has a high error rate. When BT PER>PER_H is 0 (false), this means overall Bluetooth operation has a low error rate. When BT PER>PER_H is 1 (true), this means overall Bluetooth operation has a high error rate. These factors may be evaluated during every interference assessment window. For example, $SLER_{off}$ and BT PER may be averaged over a window of $T_{SLER}$ seconds. However, the state diagram transitions (comparing the statistics to the thresholds) may happen on a faster time scale $T_{IA}$. This may involve additional storage of metrics over multiple $T_{IA}$ periods for the BT PER and $SLER_{off}$ estimation.

Transitions lines in FIG. 12D show either a 0, 1, or x. A 0 means the transition happens when the statistic is false, a 1 means the transition happens when the statistic is true, and an x means that particular statistic doesn't matter in the state transition decision. For example, 01 is shown on the line transitioning from LTE power backoff OFF state 1220 to the LTE power backoff ON state 1222. This means that when in the LTE power backoff OFF state 1220, the coexistence manager will transition to the LTE power backoff ON state 1222 when $SLER_{off}$ is not greater than the threshold $SLER\_L \pm H$ (the 0 in the first digit) and the Bluetooth packet error rate is greater than the threshold PER_H (the 1 in the second digit). The situation where the factors are 01 indicates that LTE is interfering with Bluetooth because Bluetooth operation without LTE has a low error rate (the 0 in the first digit) but Bluetooth operation overall has a high error rate (the 1 in the second digit). Thus, when LTE is interfering with Bluetooth the coexistence manager moves from the LTE power backoff OFF state 1220 to the LTE power backoff ON state 1222 in an attempt to have power backoff reduce the level of LTE interference to Bluetooth.

As shown in FIG. 12D, once the LTE power backoff ON state 1222, the coexistence manager may stay in the power backoff loop if the factors are 00 or 01. 00 means Bluetooth operation without LTE has a low error rate and Bluetooth overall error rate is low. 01 means Bluetooth operation without LTE has a low error rate and Bluetooth overall error rate is high. In other words, error rates are low while power backoff is operating, meaning power backoff is working. From the LTE power backoff ON state 1222, the coexistence manager may return to the LTE power backoff OFF state 1220 when Bluetooth operation without LTE has a high error rate (1x), indicating that power backoff may no longer be effective.

Thus, the transitions between states 1220 and 1222 may be summarized as follows:

| $SLER_{off} >$ SLER_L ± H | BT PER > PER_H | Action if in Loop ON | Action if in Loop OFF |
|---|---|---|---|
| 0 | 0 | Stay | Stay |
| 0 | 1 | Stay | Switch |
| 1 | 0 | Switch | Stay |
| 1 | 1 | Switch | Stay |

Exit Criteria

In certain circumstances, a chosen solution (such as power backoff) may not be sufficient to solve multi-radio interference problems. Further, it may be undesirable to continue a chosen solution (for example too much LTE power backoff may result in a lost LTE signal). To determine when it may no longer be desirable to transition back and forth between the power backoff ON and OFF states (such repeated transitions may indicate a different coexistence management approach should be implemented), the coexistence manager may implement certain exit criteria. These exit criteria offer a fallback to scenarios where power backoff is no longer desired. Examples of such scenarios include when LTE is the cause of interference but the Bluetooth error rate remains high even though power backoff has reached its highest possible value, or when a persistently high Bluetooth packet error rate exists due to external sources. In such scenarios it may be desirable to exit interference assessment to restore LTE operability or to attempt a different coexistence solution.

To determine whether to exit interference assessment, the coexistence manager may evaluate exit criteria at the end of each packet headroom window. A number of exit criteria may be used, such as whether the Bluetooth packet error rate continues to be above a certain high threshold (indicating that Bluetooth is suffering a high error rate despite the power backoff loop). If the exit criteria is met, the coexistence manager may set an exit criteria bit, EC(n). EC(n) starts at 0 but is set to 1 each time the exit criteria is met. EC(n) may then be reset during the next interference assessment window. After a certain number of interference assessment periods, if EC(n) was set to 1 over a certain threshold of times, the coexistence manager may exit interference assessment. This may be expressed in the following equation:

$$\sum_{k=n-M+1}^{n} EC(n) \geq N$$

where M is the number of interference assessment period and N is the certain threshold number of times the EC is set.

One possible outcome after exiting interference assessment is to perform LTE handover so that LTE uplink communications are moved to a range of Band 7 that is not proximate to the ISM band in which Bluetooth operates. If handover or other coexistence solutions are an option, another flag, HO, may be implemented to differentiate between exit scenarios that result from LTE not being the cause of interference from those scenarios where LTE is the cause, but power backoff is unsuccessful. If the HO flag is available, the HO flag may be set when exit criteria are met and LTE is the cause of Bluetooth interference and the EC flag may be used when exit criteria are met and LTE is not the cause of Bluetooth interference.

As shown in FIG. 12C, the HO and EC flags may be set when transitioning between the LTE power backoff ON state 1212 and the LTE power backoff OFF state 1210. The EC flag is set when the $SLER_g$=High factor is 1 (1xx), meaning that the Bluetooth link is bad even without LTE, indicating that LTE is not the source of interference. The HO flag is set when the $SLER_g$=High factor is 0 and the BT PER=High factor is 1 (01x), meaning that because of LTE the Bluetooth link is bad but power backoff is not solving the problem and another solution is desired. When the factors are 001, the interference has ceased, so neither the EC flag nor the HO flag is set. As with the EC flag, after a certain number of interference assessment periods, if HO(n) was set to 1 over a certain threshold of times, the coexistence manager may begin handover procedures. This may be expressed in the following equation:

$$\sum_{k=n-M+1}^{n} HO(n) \geq K$$

where M is the number of interference assessment period and K is the certain threshold number of times the HO is set.

A similar exit criteria shown in FIG. 12D as OUT(n) operates in a similar manner as HO for FIG. 12C. The OUT flag for FIG. 12D may be set when the Bluetooth overall error rate becomes high while (01) in the power backoff loop state. The EC flag in FIG. 12D may be set when transitioning from the LTE power backoff ON state 1222 to the LTE power backoff OFF state 1220 (1x). As with FIG. 12C, the Exit Use case state 1224 may be entered when the EC flag and/or OUT flag is set to 1 over a certain threshold of times during a certain number of interference assessment periods.

The time hysteresis/HO/OUT indicates that the algorithm exits for some time T_hyst, and after that performance is reevaluated and the state machine starts. The benefit is when, for example, exiting the state machine because power backoff is not effective, which could be due to LTE being at coverage edge and cannot significantly reduce its power, or Bluetooth has a poor RSSI and desires a significant power backoff. After the time T_hyst, the link conditions for LTE and or Bluetooth may have improved and thus power backoff could now be an effective solution.

RSSI Determinations

In another aspect, Bluetooth received signal strength indication (RSSI) may be evaluated to determine if LTE is the cause of Bluetooth interference. If RSSI is low, it may be assumed that Bluetooth is out of coverage range and LTE is not the cause of interference. If Bluetooth RSSI is high, and Bluetooth's packet error rate is high, it may be assumed that LTE is the cause.

Interference Assessment During A2DP Operation

Interference assessment during A2DP (audio streaming) operation is similar to interference assessment during eSCO operation, however Bluetooth performance is not measured by slot error rate, but by a performance metric more relevant to A2DP operation. For example, when the multi-radio device is acting as a Bluetooth master it may use access code, header error check (HEC) error rate, head of the queue packet delay, number of flushes, CRC error rate, or RSSI as measures of Bluetooth performance. When the multi-radio device is acting as a Bluetooth slave, it may use a number of detected receive slots, header error check (HEC) error rate, head of the queue packet delay, number of flushes, or RSSI as measures of Bluetooth performance.

For a Bluetooth master, HEC error rate (HER) may be calculated as follows. First, the master calculates the $HER_{good}$ (for Bluetooth transmissions with no LTE overlap) and $HER_{bad}$ (for Bluetooth transmissions with LTE overlap) through the following definition:

$$HER_x = 1 - \frac{k_x}{N_x}$$

where x: denotes off or on (or good or bad), $k_x$ denotes the number of successfully detected receive slots when LTE is x (off/on), and $N_x$ denotes the total number of expected receive slots when LTE is x (off/on). Transmission overlap is determined when LTE is transmitting in the lower part of Band 7 while Bluetooth is simultaneously receiving.

For a Bluetooth master, packet error rate (PER) when LTE is off may be calculated as follows:

$$PER_{off}(n) = 1 - \frac{k_{off,ACK}(n)}{Noff(n)}$$

where $k_{X,ACK}$ is the number of successfully detected Bluetooth receive slots when LTE is off carrying ACK and $N_x$ is the total number of expected receive slots when LTE is off. $PER_{off}$(n) accounts for the Bluetooth link error rate due to a HER or a CRC error during the n-th update period, and PER(0) is initialized to 0. The PER may be estimated over a period $T_{PER}$. If the number of samples $N_{off}$ during this period is less than some value $N_{min}$, then the PER of a previous update time may used instead. $T_{PER}$ may be larger than the interference assessment update time $T_{IA}$, and calculating the average PER may require a sliding time window. A coexistence manager may calculate an order statistic of the delay of the packets: $D_X$ which denotes the x percentile of the delay complementary distribution function (CDF). This reflects the link overall performance and is the equivalent of Bluetooth average PER for eSCO operation.

A transmission (Tx) packet error rate may be expressed by an equation where the packet error rate is the number of packets that receive a negative acknowledgement (#ARQN=NACK) divided by the number of successfully received receive slots:

$$PER_{Tx} = \frac{\# ARQN = NACK}{\# \text{Successfully received receive slots}}$$

Several interference assessment statistics may be used similar to the factors described above in reference to the state machine of FIGS. 12A-D. For a Bluetooth as master, a first statistic, S1 is whether $HER_{bad}$–$HER_{good}$ is less than a threshold level. A second statistic, S2 is whether the delay (D) of the packets is above a certain threshold. A third statistic, S3 is whether the power backoff is below a certain threshold level. In the master case, transmission error rate may also be considered for S1 because usually limitations in communication success are caused by a remote device, e.g., headset.

For a Bluetooth slave, HEC error rate (HER) may estimated as follows:

$$HER_x = 1 - \frac{M_x}{N_x}$$

where Mx is the number of detected receive slots when LTE is x (x=good/bad) during an interference assessment period and N is the total number of attempted receive slots, which may be unknown. Given N is unknown, let $N_{on}=N^*DC$, and $N_{off}=N^*(1-DC)$ where DC denotes the percentage of receive slots when there is an LTE overlap (overlap defined as LTE transmissions in the lower portion of Band 7 during a Bluetooth receive event). For Bluetooth as slave, the first statistic S1 may then be calculated as:

$$S1: \frac{HER_{bad} - HER_{good}}{1 - HER_{good}} = 1 - \frac{M_{bad}(1-DC)}{M_{good}DC} < Thr\_L$$

where Thr_L is a given threshold. As with Bluetooth operating as a master, for Bluetooth operating as a slave the second statistic, S2 is whether the delay (D) of the packets is above a certain threshold and the third statistic, S3 is whether the power backoff is below a certain threshold level.

Figure 13A:
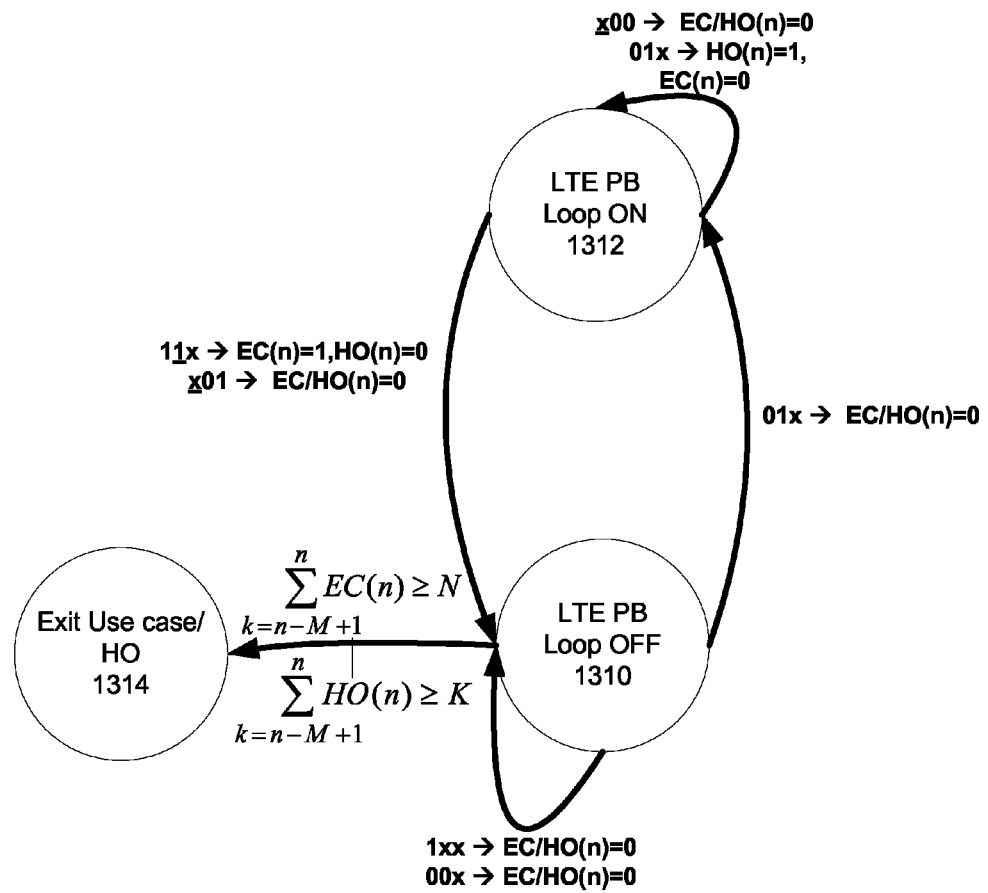
FIG. 13A is a diagram illustrating states of operation for a coexistence manager according to one aspect of the present disclosure.

FIG. 13A shows a power backoff state machine for A2DP operation with the Bluetooth operating as a master or slave. It operates in the same manner as the eSCO state machine of FIG. 12C, with the following variations:

When in the loop ON state 1312, S1, S2, and S3 bits as (x00) as opposed to (000) will cause the state to remain in loop ON. This is because after power backoff S1 could be 1 or 0. Without a good independent statistic, the state machine remains in loop ON 1312. It also avoids a false alarm (01x) that could result from power backoff being insufficient in the presence of a second dominant interferer.

When in the loop ON state 1312, S1, S2, and S3 bits as (11x) as opposed to (1xx) will cause a transition to the loop OFF state 1310. This is because S1=1 is not sufficient to exit the power backoff loop. Also, (x01) instead of (001) causes a transition to the loop OFF state 1310. Exit Use case state 1314 is similar to the Time Hysteresis state 1214 of FIG. 12C.

Thus, the transitions between states 1310 and 1312 may be summarized as follows:

| HER = High | Delay = High | Backoff < threshold | Action if in Loop ON | Action if in Loop OFF |
|---|---|---|---|---|
| 0 | 0 | 0 | Stay | Stay |
| 0 | 0 | 1 | Switch | Stay |
| 1 | 0 | 0 | Stay | Stay |
| 1 | 0 | 1 | Switch | Stay |
| 0 | 1 | x | Stay | Switch |
| 1 | 1 | x | Switch | Stay |

In another aspect, interference assessment during Bluetooth A2DP slave operation may be performed in a manner using packet error rate (PER) similar to that using slot error rate described above in reference to FIG. 12D. For interference assessment during A2DP slave operation, two packet error rate (PER) statistics may be used:

$S1_{PER}$: A comparison of the Bluetooth packet error rate when LTE is not transmitting ($PER_{off}$) to a threshold. $PER_{off}$ must be lower than a threshold PER_H to stay or enter a LTE power backoff loop (or other coexistence management scheme). Thus, when $PER_{off}$>PER_H is true (1), no LTE power backoff is implemented. It also avoids a false alarm (01) that could result from power backoff being insufficient in the presence of a second dominant interferer.

$S2_{DELAY}$: A comparison of the packet delay to a delay threshold ($D_X$>D_H).

Figure 13B:
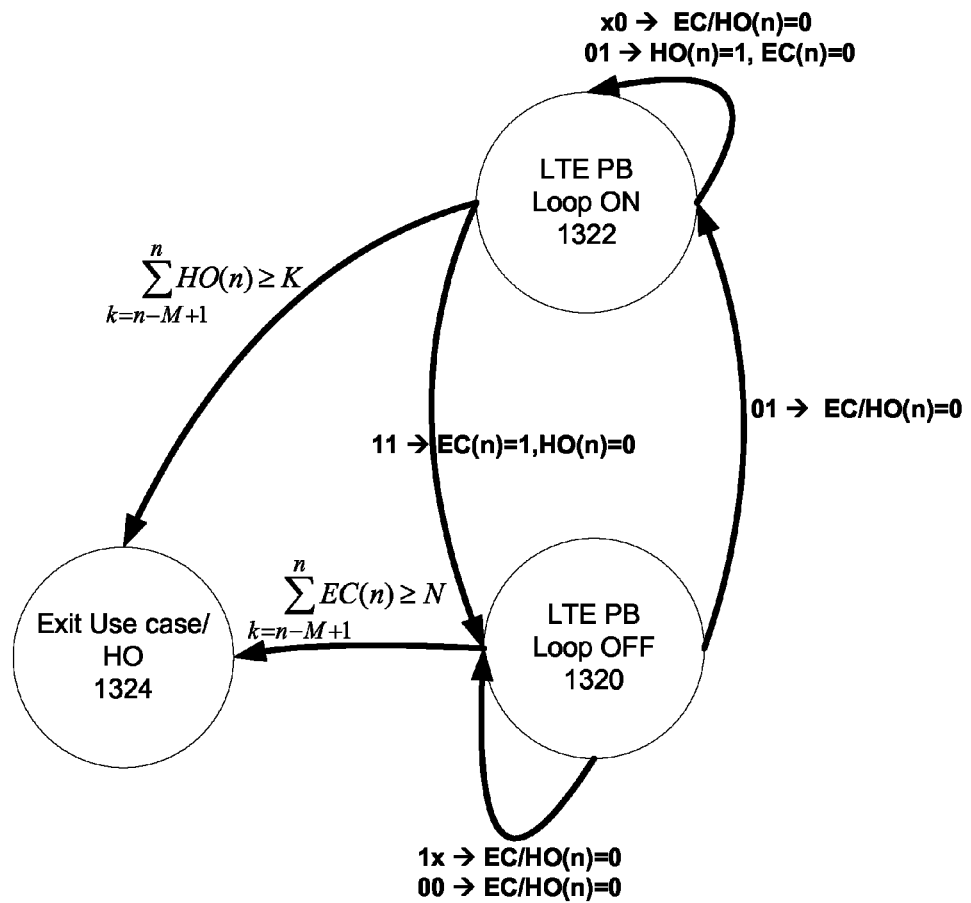
FIG. 13B is a diagram illustrating states of operation for a coexistence manager according to one aspect of the present disclosure.

FIG. 13B shows a power backoff state machine for A2DP operation with the Bluetooth operating as a slave. It operates in the same manner as the eSCO state machine of FIG. 12D, with the following variations:

When in the loop ON state 1322, $S1_{PER}$ and $S2_{DELAY}$ as (x0) as opposed to (00) will cause the state to remain in loop ON. This is because if during power backoff, the delay is low ($S2_{DELAY}$=0) it may be desirable to continue with power backoff.

When in the loop ON state 1322, $S1_{PER}$ and $S2_{DELAY}$ as (x0) as opposed to (1x) will cause a transition to the loop OFF state 1320. This is because $S1_{PER}$=1 is not sufficient to exit the power backoff loop if the packet delay is low. Exit Use case/HO state 1324 is similar to the Exit Use case state 1224 of FIG. 12D.

Thus, the transitions between states 1320 and 1322 may be summarized as follows:

| PER = High | Delay = High | Action if in Loop ON | Action if in Loop OFF |
|---|---|---|---|
| 0 | 0 | Stay | Stay |
| 0 | 1 | Stay | Switch |
| 1 | 0 | Stay | Stay |
| 1 | 1 | Switch | Stay |

Figure 14:
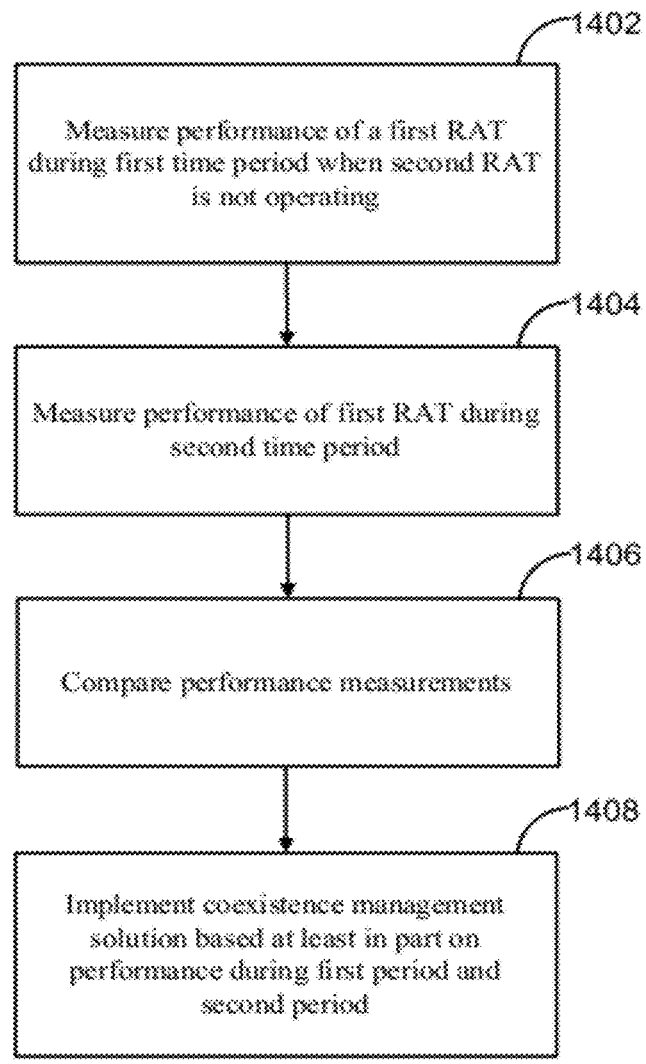
FIG. 14 is a block diagram illustrating a method for managing coexistence according to one aspect of the present disclosure.
Figure 15:
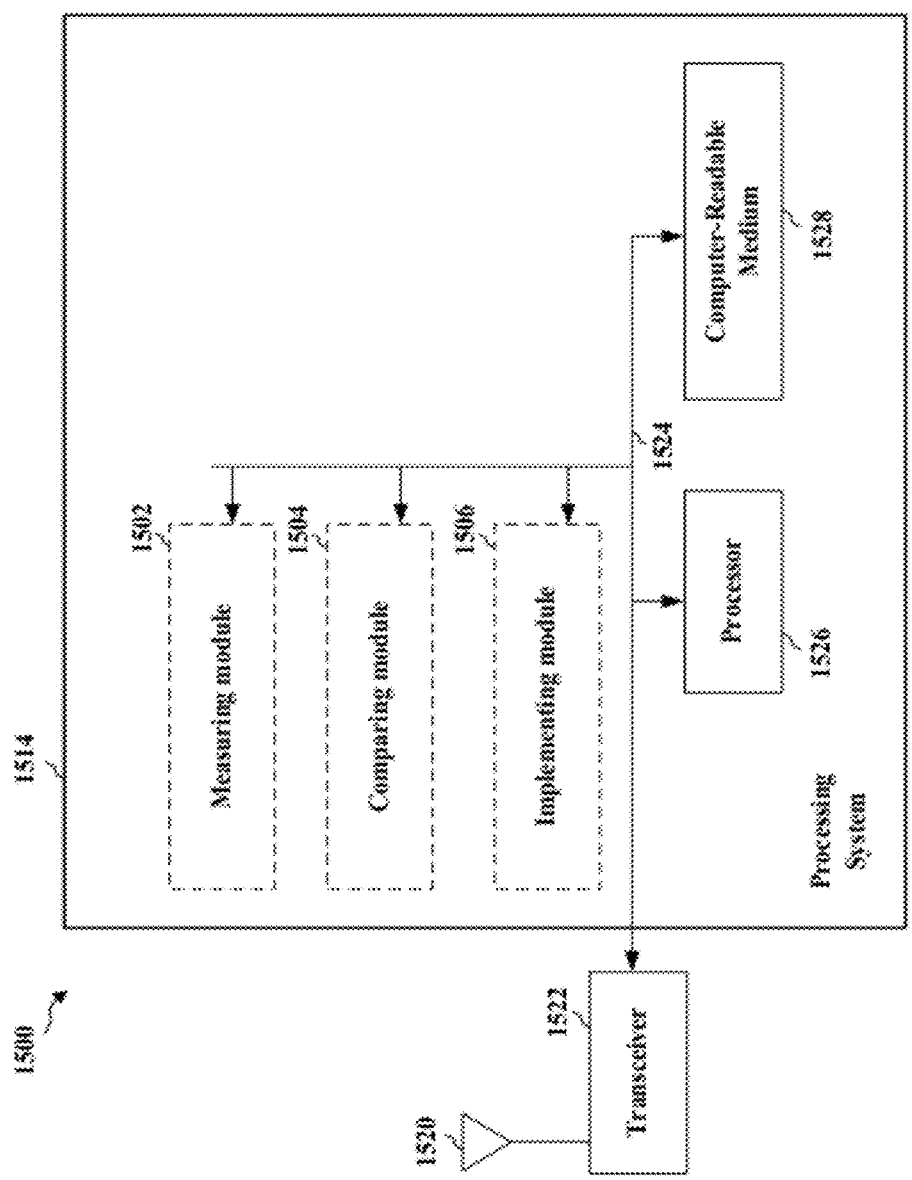
FIG. 15 is a block diagram illustrating components for managing coexistence according to one aspect of the present disclosure.

As shown in FIG. 14 a UE may measure communication performance of a first radio access technology (RAT) during a first time period when a second RAT is not operating, as shown in block 1402. A UE may measure communication performance of the first RAT during a second time period, as shown in block 1404. A UE may compare the communication performance measurements, as shown in block 1406. A UE may implement a coexistence management solution based at least in part on the communication performance during the first time period and the communication performance during the second time period, as shown in block 1408. Implementation performance may be based at least in part on the communication performance during the first time period being above a first threshold value and the communication performance during the second time period being below a second threshold value FIG. 15 is a diagram illustrating an example of a hardware implementation for an apparatus 1500 employing a coexistence management implementation system 1514. The coexistence management implementation system 1514 may be implemented with a bus architecture, represented generally by a bus 1524. The bus 1524 may include any number of interconnecting buses and bridges depending on the specific application of the coexistence management implementation system 1514 and the overall design constraints. The bus 1524 links together various circuits including one or more processors and/or hardware modules, represented by a processor 1526, a measuring module 1502, a comparing module 1504 and an implementing module 1506, and a computer-readable medium 1528. The bus 1524 may also link various other circuits such as timing sources, peripherals, voltage regulators, and power management circuits, which are well known in the art, and therefore, will not be described any further.

The apparatus includes the coexistence management implementation system 1514 coupled to a transceiver 1522. The transceiver 1522 is coupled to one or more antennas 1520. The transceiver 1522 provides a means for communicating with various other apparatus over a transmission medium. The coexistence management implementation system 1514 includes the processor 1526 coupled to the computer-readable medium 1528. The processor 1526 is responsible for general processing, including the execution of software stored on the computer-readable medium 1528. The software, when executed by the processor 1526, causes the coexistence management implementation system 1514 to perform the various functions described supra for any particular apparatus. The computer-readable medium 1528 may also be used for storing data that is manipulated by the processor 1526 when executing software. The measuring module 1502 for measures communication performance of a first radio access technology (RAT) during a first time period when a second RAT is not operating and measures communication performance of the first RAT during a second time period. The comparing module 1504 compares the communication performance measurements. The implementing module 1506 implements a coexistence management solution based at least in part on the communication performance during the first time period and the communication performance during the second time period. The measuring module 1502, the comparing module 1504 and the implementing module 1506 may be software modules running in the processor 1526, resident/stored in the computer readable medium 1528, one or more hardware modules coupled to the processor 1526, or some combination thereof. The coexistence management implementation system 1514 may be a component of the UE 250 and may include the memory 272 and/or the processor 270.

In one configuration, the apparatus 1500 for wireless communication includes means for measuring. The means may be the measuring module 1502, measuring resolution module 1014, and/or the coexistence management implementation system 1514 of the apparatus 1500 configured to perform the functions recited by the measuring means. As described above, the means may include antennae 1520/252, processor 1526/270, transceiver 1522, memory 272, computer readable medium 1528, and/or receiver 254. In another aspect, the aforementioned means may be any module or any apparatus configured to perform the functions recited by the aforementioned means.

In one configuration, the apparatus 1500 for wireless communication includes means for comparing. The means may be the comparing module 1504, coexistence resolution module 1016, and/or the coexistence management implementation system 1514 of the apparatus 1500 configured to perform the functions recited by the means. As described above, the means may include processor 1526/270, memory 272, and/or computer readable medium 1528. In another aspect, the aforementioned means may be any module or any apparatus configured to perform the functions recited by the aforementioned means.

In one configuration, the apparatus 1500 for wireless communication includes means for implementing. The means may be the implementing module 1506, coexistence resolution module 1016, and/or the coexistence management implementation system 1514 of the apparatus 1500 configured to perform the functions recited by the means. As described above, the means may include coexistence manager 640, antennae 1520/252, processor 1526/270, transceiver 1522, memory 272, computer readable medium 1528, and/or transmitter 254. In another aspect, the aforementioned means may be any module or any apparatus configured to perform the functions recited by the aforementioned means.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications, comprising:
   measuring a first communication performance of a first radio access technology (RAT) of a user equipment during a first time period when a second RAT of the user equipment is not operating;
   measuring a second communication performance of the first RAT during a second time period;
   comparing the first communication performance measurement to the second communication performance measurement;
   determining that the second RAT is causing interference to the first RAT based on the second communication performance measurement differing from the first communication performance measurement by a threshold;
   calculating a packet delay statistic for the first RAT; and
   implementing, at a third time period, a coexistence management solution based at least in part on the determining and in part on the packet delay statistic, the third time period arriving after the first time period and the second time period, in which the coexistence management solution reduces interference to the first RAT from the second RAT.

2. The method of claim 1 in which the first RAT comprises Bluetooth and the second RAT comprises Long Term Evolution (LTE).

3. The method of claim 1 in which the coexistence management solution comprises power backoff.

4. The method of claim 1 in which the coexistence management solution comprises frequency handover.

5. The method of claim 1 in which the second RAT is operating during the second time period.

6. The method of claim 1 in which the measuring the first communication performance during the first time period comprises measuring at least one of a packet error rate, slot error rate, received signal strength indicator (RSSI), header error check (HEC) error rate, a number of detected receive slots, a head of queue packet delay, or a number of flushes.

7. An apparatus for wireless communication, comprising:
   means for measuring a first communication performance of a first radio access technology (RAT) of a user equipment during a first time period when a second RAT of the user equipment is not operating;
   means for measuring a second communication performance of the first RAT during a second time period;
   means for comparing the first communication performance measurement to the second communication performance measurement;
   means for determining that the second RAT is causing interference to the first RAT based on the second communication performance measurement differing from the first communication performance measurement by a threshold;
   means for calculating a packet delay statistic for the first RAT; and
   means for implementing, at a third time period, a coexistence management solution based at least in part on the determining and in part on the packet delay statistic, the third time period arriving after the first period time and the second time period, in which the coexistence management solution reduces interference to the first RAT from the second RAT.

8. The apparatus of claim 7 in which the first RAT comprises Bluetooth and the second RAT comprises Long Term Evolution (LTE).

9. The apparatus of claim 7 in which the coexistence management solution comprises power backoff.

10. The apparatus of claim 7 in which the coexistence management solution comprises frequency handover.

11. The apparatus of claim 7 in which the second RAT is operating during the second time period.

12. The apparatus of claim 7 in which the means for measuring the first communication performance during the first time period comprises means for measuring at least one of a packet error rate, slot error rate, received signal strength indicator (RSSI), header error check (HEC) error rate, a number of detected receive slots, a head of queue packet delay, or a number of flushes.

13. A computer program product for wireless communication in a wireless network, comprising:
   a non-transitory computer-readable medium having non-transitory program code recorded thereon, the program code comprising:
      program code to measure a first communication performance of a first radio access technology (RAT) of a user equipment during a first time period when a second RAT of the user equipment is not operating;
      program code to measure a second communication performance of the first RAT during a second time period;
      program code to compare the first communication performance measurement to the second communication performance measurement;
      program code to determine that the second RAT is causing interference to the first RAT based on the second communication performance measurement differing from the first communication performance measurement by a threshold;
      program code to calculate a packet delay statistic for the first RAT; and
      program code to implement, at a third time period, a coexistence management solution based at least in part on the determining and in part on the packet delay statistic, the third time period arriving after the first time period and the second time period, in which the coexistence management solution reduces interference to the first RAT from the second RAT.

14. The computer program product of claim 13 in which the first RAT comprises Bluetooth and the second RAT comprises Long Term Evolution (LTE).

15. The computer program product of claim 13 in which the coexistence management solution comprises power backoff.

16. The computer program product of claim 13 in which the coexistence management solution comprises frequency handover.

17. The computer program product of claim 13 in which the second RAT is operating during the second time period.

18. The computer program product of claim 13 in which the program code to measure the first communication performance during the first time period comprises program code to measure at least one of a packet error rate, slot error rate, received signal strength indicator (RSSI), header error check (HEC) error rate, a number of detected receive slots, a head of queue packet delay, or a number of flushes.

19. An apparatus for wireless communication, comprising:
a memory; and
at least one processor coupled to the memory, the at least one processor being configured:
to measure a first communication performance of a first radio access technology (RAT) of a user equipment during a first time period when a second RAT of the user equipment is not operating;
to measure a second communication performance of the first RAT during a second time period;
to compare the first communication performance measurement to the second communication performance measurement;
to determine that the second RAT is causing interference to the first RAT based on the second communication performance measurement differing from the first communication performance measurement by a threshold;
to calculate a packet delay statistic for the first RAT; and
to implement, at a third time period, a coexistence management solution based at least in part on the determining and in part on the packet delay statistic, the third time period arriving after the first time period and the second time period, in which the coexistence management solution reduces interference to the first RAT from the second RAT.

20. The apparatus of claim 19 in which the first RAT comprises Bluetooth and the second RAT comprises Long Term Evolution (LTE).

21. The apparatus of claim 19 in which the coexistence management solution comprises power backoff.

22. The apparatus of claim 19 in which the coexistence management solution comprises frequency handover.

23. The apparatus of claim 19 in which the second RAT is operating during the second time period.

24. The apparatus of claim 19 in which the at least one processor configured to measure the first communication performance during the first time period comprises the at least one processor configured to measure at least one of a packet error rate, slot error rate, received signal strength indicator (RSSI), header error check (HEC) error rate, a number of detected receive slots, a head of queue packet delay, or a number of flushes.

* * * * *